United States Patent [19]

Hall et al.

[11] Patent Number: 5,094,649

[45] Date of Patent: Mar. 10, 1992

[54] APPARATUS FOR PEELING SAUSAGES

[75] Inventors: Mark R. Hall, Lorretto; Larry A. Rohde, Mississauga; Michael L. Samarco, Brampton; Edward Kroeger, North York, all of Canada

[73] Assignee: Canada Packers Inc., Ontario, Canada

[21] Appl. No.: 545,823

[22] Filed: Jun. 29, 1990

[51] Int. Cl.⁵ .................. A22C 11/00; A22C 13/00
[52] U.S. Cl. .................................................. 452/50
[58] Field of Search ........................................ 452/50

[56] References Cited

U.S. PATENT DOCUMENTS

| | | | |
|---|---|---|---|
| 2,685,518 | 9/1948 | Prohaska | 99/109 |
| 2,800,681 | 7/1957 | Demarest | 452/50 |
| 3,095,603 | 9/1959 | May | 17/25 |
| 3,149,369 | 9/1964 | Cross et al. | 452/50 |
| 3,159,868 | 9/1960 | Allen et al. | 17/1 |
| 3,204,844 | 9/1965 | Wallace | 226/104 |
| 3,408,205 | 10/1966 | Olson et al. | 99/109 |
| 3,895,414 | 7/1975 | Klyce | 452/50 |
| 4,024,602 | 5/1977 | Stiles | 452/50 |
| 4,118,828 | 10/1978 | Melanson | 452/50 |
| 4,222,150 | 9/1980 | Andersen | 17/1 |
| 4,637,095 | 1/1987 | Maruska | 452/50 |

Primary Examiner—Willis Little
Attorney, Agent, or Firm—Bacon & Thomas

[57] ABSTRACT

An apparatus for removing the skins or casings from sausage products includes an abrasion means suitably in the form of a pair of counter rotating, rough surfaced rollers through which the sausages pass after the casings have been slit longitudinally, to tear the casings off the sausages abrasively. Immediately downstream of the abrading means is a suction means, preferably in the form of a perforated suction roller, which sucks the casing remnants away from the residual sausages. The apparatus avoids the need for the use of compressed air to loosen and separate the casings from the sausages, thereby drastically reducing tne nose level at which the apparatus operates, and eliminating the risk of bacterial contamination inherent in the use of jets of compressed air.

9 Claims, 2 Drawing Sheets

5,094,649

APPARATUS FOR PEELING SAUSAGES

FIELD OF THE INVENTION

This invention relates to sausage manufacture, and more particulary to apparatus for removing the casings from cooked sausage products.

BACKGROUND AND PRIOR ART

Many sausage products such as wieners and frankfurters comprise cooked meats and are provided with temporary skins or casings during their manufacture and processing. The casings are filled with meat ingredients which are cooked therein. Then, the casings are often removed prior to packaging and sale of the sausages. The casing removal must be accomplished without damaging the sausage shape and texture. It should also preferably be accomplished on a continuous basis and at relative high speed, for economic reasons.

Prior art methods of sausage casing removal have largely relied on the use of compressed air for this purpose. Thus the sausages are conveyed, longitudinally and in single file, as a string joined together by their casings, through a tube in which they are warmed and moistened with steam so as to loosen the casing. Then the casing is slit longitudinally by a knife. A jet of compressed air is then applied to remove the casing. Then the sausage and casing are separated, eg using a suction roller, the casings are discarded and the sausages moved on to a packaging station.

Whilst such a process can be operated efficiently, the use of compressed air is a drawback. Air jets applying the compressed air to the sausages, at sufficient force to effect the casing removal, are extremely noisy, and present the process operator with an unpleasant environment. Earplugs are a necessity for any worker operating in the vicinity of any such process and working apparatus. Moreover, there is a risk of bacterial contamination of the product inherent in the use of air jets, which are liable to pick up airborne bacteria and convey them to the food product.

U.S. Pat. No. 4,222,150 Anderson, describes an apparatus for peeling sausauges in which the sausages, after the casings have been slit, encounter a pair of counter-rotating rollers forming a nip disposed at an obtuse angle to the longitudinal direction of the sausages. One of the roller surfaces may have a roughened portion. the casings are gripped by the nip and passed through it, as they are pulled off the sausages, whilst the peeled sausages pass over the counter-rotating rollers and do not pass through the nip. Whilst the Anderson apparatus avoids the use of air jets, it requires the use of liquid jets to keep the rollers clean and properly operational. It is inefficient in practice, and liable to cause damage to the sausages as they contact the peeling rollers.

It is an object of the present invention to provide a novel sausage casing removal apparatus, but nevertheless operates efficiently over extended periods of time.

It is a further object of the invention to provide such an apparatus which avoids the necessity of using compressed air.

SUMMARY OF THE INVENTION

In the apparatus of the present invention, casings are removed from cooked sausages by combination of abrasion and suction. After the casings have been slit longitudinally, the sausages encounter and pass through an abrading station where the casings are abraded off the sausages without damage to the sausages themselves, and thence encounter a suction station where the casings are sucked away from the sausages and totally separated therefrom. By the provision of this abrasion means, in combination with the suction means, the need for compressed air to remove or loosen the casings is avoided.

Thus, according to the present invention, there is provided an apparatus for removing casings from sausages, comprising:

conveying means adapted to convey the sausages longitudinally through the apparatus;

slitting means adapted to slit the sausage casings longitudinally as they are conveyed by said conveying means;

abrading means positioned downstream of the slitting means and adapted to contact the sausage casings as the sausages are conveyed thereto and to tear the sausage casings away from the sausages, said abrading means comprising at least one roller with a cylindrical, roughened contact surface disposed at an angle of about 25°-35° to the perpendicular axis of the sausages; and suction means positioned downstream of the abrading means and adapted to suck the torn casings away from the sausages and direct them along a divergent path from that followed by the casing-free sausages.

BRIEF REFERENCE TO THE DRAWINGS

In the drawings, like reference numerals indicate like parts.

DESCRIPTION OF THE PREFERRED EMBODIMENTS

Preferably, in the apparatus according to the invention, the abrading means comprises a pair of cylindrical rollers, with roughened contact surfaces spaced apart an appropriate distance to contact the sausages passing between them so as to effect the tearing and abrading of the casings without substantially compressing the sausages. The rollers are driven to rotate in mutually opposite senses, in the direction of travel ofthe sausages so as to form an orifice through which the sausages move and to assist in conveying them. Preferably the rollers are mutually parallel, and each has an axis of rotation disposed at an angle of about 25°-35°, preferably 27°-30°, to the perpendicular axis of the sausages passing therethrough.

Preferably, also, the contact surfaces of the rollers are knurled with ridges disposed in a spiral pattern around the surfaces, the ridges being disposed at an angle of about 30°-60° preferably 45°, relative to the axis of rotation of the rollers. The surface speed of travel of the rollers should be at least as fast as that of the sausages. A typical operating speed is about 1,000 feet per minute.

Also, according to the preferred embodiment, the suction means, located downstream from the cylindrical abrading rollers, comprises a suction roller having a perforated cylindrical surface over which the sausages pass after they have been subjected to the abrasion effects of the rollers. The suction roller is driven to rotate about an axis transverse to the longitudinal axis of the sausages, and the sausages are supported and by the roller as suction is applied through the roller surface perforation to separate the torn casings from the sausages. They are propelled across the suction roller by drive imparted by the abrading rollers. The casing remnants then follow the periphery of the roller and are drawn therefrom by vaccum, whilst the sausages continue on a different, higher path so as to complete the separation. The suction applied should be of magnitude ten inches or more, to effect positive separation of casings from sausages and to prevent jamming of the apparatus with casing remnents.

DESCRIPTION OF THE SPECIFIC PREFERRED EMBODIMENT

Figure 1:
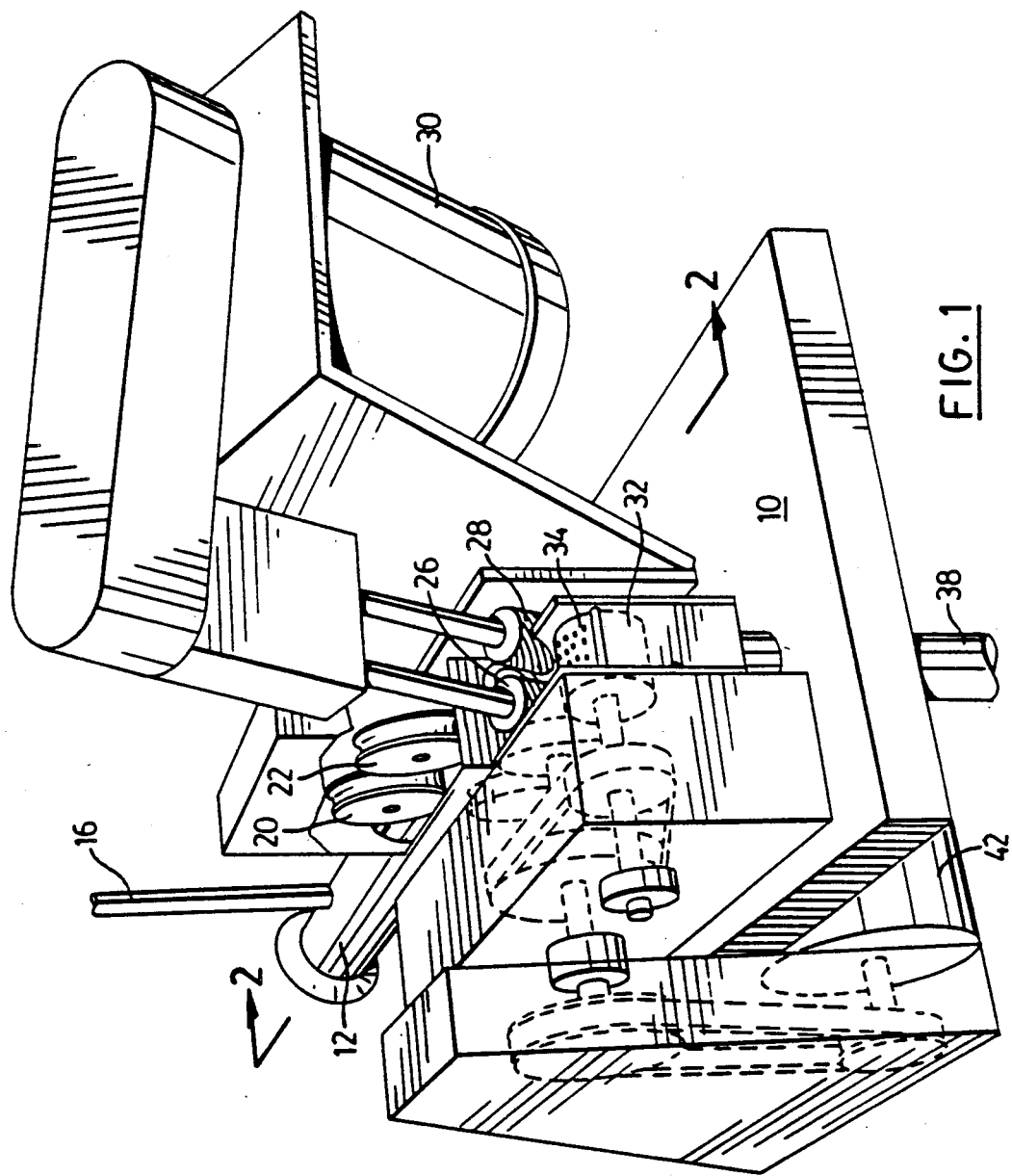
FIG. 1 is a diagrammatic perspective view of a sausage peeling apparatus according to the preferred embodiment of the invention, with parts cut away.
Figure 2:
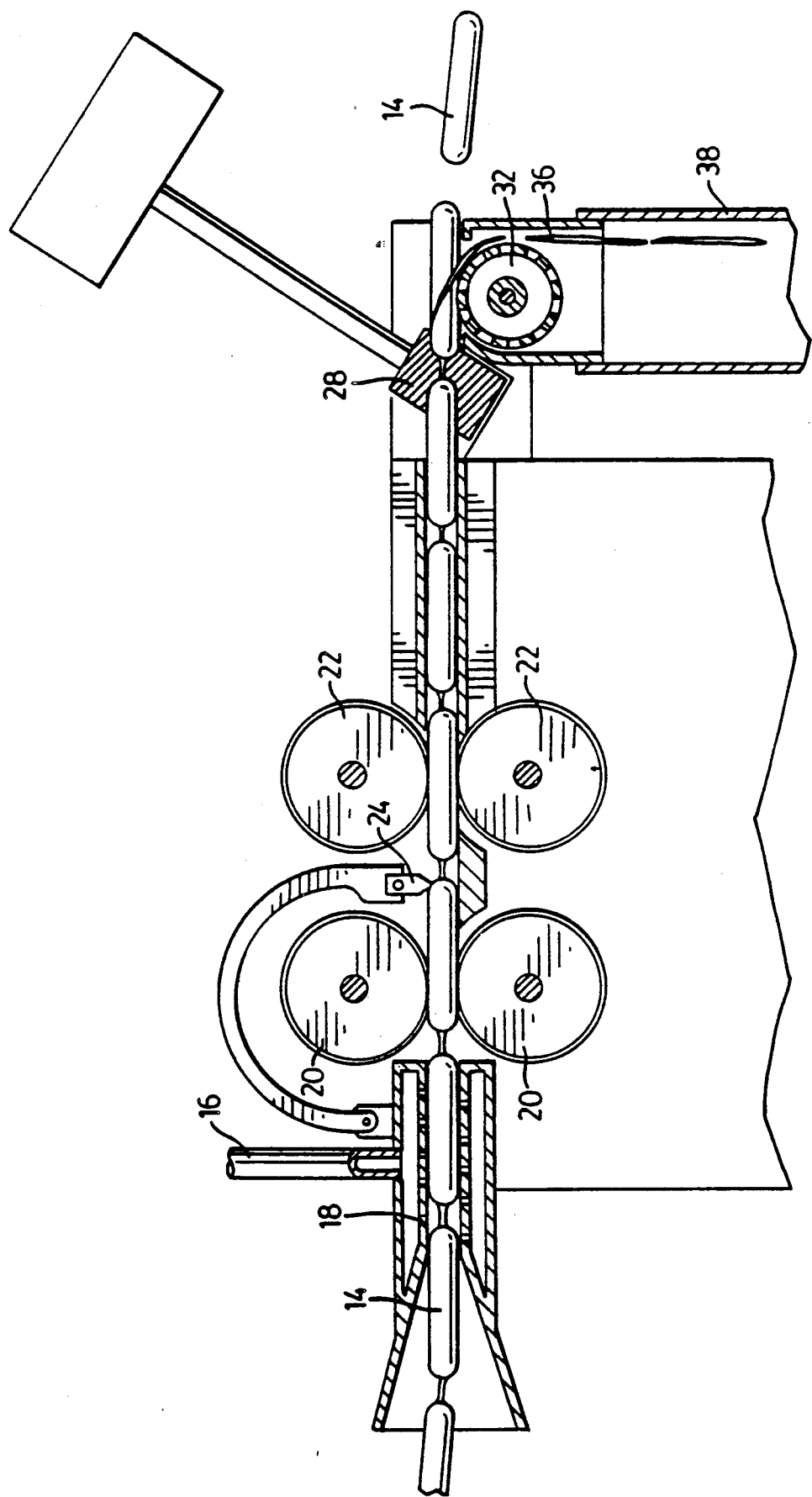
FIG. 2 is a sectional view along the line 2—2 of FIG. 1, and showing the apparatus in operation.

With reference to the drawings, the sausage peeling apparatus comprises a base 10 on which is mounted a conveying tube 12, disposed substantially horizontally. The interior dimensions of the tube 12 are such that sausages 14 move therethrough longitudinally, in single file, as a continuous string, joined by their casing. They move in relative close proximity to the tube walls. A steam injection pipe 16 supplies heat and moisture to the environment to the sausages 14, via perforations 18 in the inner wall of the conveying tube 12. Two pairs of drive wheels 20, 22, with part-circular concave rims are provided, one of each pair above the conveying tube 12 and the other below the conveying tube 12. Each of the wheels 20, 22 is self-lubricating and is made of medium density polyethylene, so as to avoid marking or scoring of the sausage surfaces. The wheels 20, 22 project into slits in the conveying tube 12, and are vertically spaced apart an appropriate distance so as to grip the sausages 14 lightly and propel them along the tube 12. A slitting means in the form of a pivoted, spring tensioned blade 24 (FIG. 2) projects into the tube 12 at a position between the pairs of drive wheels 20, 22 and is positioned to slit the casings of the sausages 14 as they pass, without substantially penetrating into the inner sausage meat.

As the sausages 14 emerge from the downstream end of the conveying tube 12, they encounter a pair of cylindrical rollers 26, 28, each having a knurled cylindrical contact surface with ridges disposed at an angle of 45° to the roller axis. The rollers 26, 28 are driven by motor 30 in opposite directions from each other, counter to the direction of travel of the sausages 14. The axis of rotation of the rollers 26, 28 is at an angle of 29° to the vertical. They are spaced apart a sufficient distance that their knurled, rotating surfaces contact and abrade off the casings of the sausages 14, without significantly compressing the sausages 14 themselves, and without significantly hindering the travel of the sausages 14 through the apparatus. This design of abrading rollers ensures that they can be used continually without the need for cleaning, eg by water jets, during operation.

A suction means in the form of a suction roller 32, with perforations 34 in its cylindrical surface, is provided immediately downstream of the rollers 26, 28. The suction roller 32 is driven for rotation about a horizontal axis, so that the sausages 14 and casing remnants 36 emerging from between rollers 26, 28 rest on its cylindrical, perforated rotating surface and are conveyed thereby. Suction is drawn through the centre of suction roller 32 via pipe 38 connected to a pump (not shown). As a result, the casing remnants 36 are sucked away from sausages 14, follow a portion of the periphery of the suction roller 32 and drop into a waste collector (not shown). In the meantime, the peeled sausages 14 are propelled horizontally away from the suction roller 32 to a separate collection point. Suction roller 32, and drive wheel pairs 20, 22, are all driven by a common motor 42 through appropriate, standard transmission means.

In operation, the apparatus ensures efficient and simple removal of sausage casings without damage to the sausages and without resort to use of compressed air. The sausages are suitably heated and moistened to loosen the casings, by supply of steam via pipe 16. Then they are longitudinally slit by blade 24. Finally, the casings are efficiently removed and discarded by the abrasive action of the rollers 26, 28 and the suction applied by suction roller 32. The apparatus is simple to construct and operate, and will run continuously at a relatively high speed for extended periods of time, with a minimum of maintenance and supervision.

As compared with a similar apparatus employing compressed air for casing removal, instead of the abrading rollers, an apparatus of this specific embodiment operates at a total noise level of 85 decibels instead of 112 decibels. The hygiene problems inherent in air jet use, referred to previously, are also eliminated.

Whilst a specific, preferred embodiment of the invention has been illustrated and described herein in detail, it is to be understood that the scope of the invention is not limited thereto. Many variations and modifications will be apparent to the skilled reader within the scope and teaching of this specification. The scope of the invention is limited only by the scope of the appended claims, reasonably construed.

What we claim is:

1. Apparatus for removing casings from sausages, comprising:
   conveying means operable to convey sausages longitudinally through the apparatus;
   slitting means adapted to slit the sausage casings longitudinally as they are conveyed by said conveying means;
   abrading means positioned downstream of the slitting means and adapted to contact and abrade the sausage casings as the sausages are conveyed thereto, said abrading means including a pair of generally cylindrical rollers with roughened cylindrical contact surfaces, spaced apart an appropriate distance to contact opposite sides of the sausages passing therebetween, so as to effect the abrading of the casings without substantially compressing the sausages, said rollers being driven to rotate in the direction of travel of the sausages therebetween, each of said rollers having an axis of rotation disposed at an angle of from about 25° to about 35° degrees to the perpendicular axis of the sausages passing therebetween; and
   suction means positioned downstream of the abrading means and adapted to suck the abraded casings away from the sausages and direct them along a divergent path from that followed by the casing-free sausages.

2. Apparatus according to claim 1 wherein the contact surface of said rollers are knurled with ridges disposed in a spiral pattern around said surfaces.

3. Apparatus according to claim 2 wherein said ridges are disposed at an angle of about 30°–60° relative to the axis of rotation of the rollers.

4. Apparatus according to claim 3 wherein the axis of rotation of the rollers is from 27°–30° to the perpendicular axis of the sausages passing therebetween.

5. Apparatus according to claim 1 wherein said suction means comprises a suction roller having a perforated cylindrical surface contacting the sausages after their subjection to the abrading means, suction being applied through the surface perforations to separate the torn casings from the sausages.

6. Apparatus according to claim 5 wherein said suction roller is driven to rotate about an axis transverse to the longitudinal axis of the sausages passing thereover.

7. Apparatus according to claim 1 wherein said conveying means comprises a conveying tube through which the sausages pass longitudinally and in single file, and a plurality of drive wheels projecting into said Conveying tube to contact and propel the sausages therein.

8. Apparatus according to claim 7 wherein said slitting means comprises a pivoted spring tensioned blade projecting into the conveying tube.

9. Apparatus according to claim 8 further including steam supply means communicating with said conveying tube upstream of the slitting means, adapted to heat and moisten the sausages passing therethrough prior to the slitting and removal of the sausage casings.

* * * * *